Patented Jan. 6, 1953

2,624,762

UNITED STATES PATENT OFFICE 2,624,762

HYDROXY ALIPHATIC DERIVATIVES OF SYMMETRICAL DI-AROMATIC THIOUREAS

Paul M. Downey, Nitro, W. Va., assignor to Monsanto Chemical Company, St. Louis, Mo., a corporation of Delaware No Drawing. Application May 4, 1949, Serial No. 91,414

14 Claims. (Cl. 260—564)

This invention relates to new and novel compositions of matter. More particularly it relates to hydroxy aliphatic derivatives of a symmetrical di-aromatic substituted thiourea.

The new compounds may be represented by the general formula

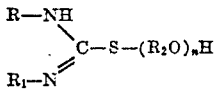

where R and $R_1$ are selected from the group consisting of tolyl, xylyl, and like alkyl substituted aromatic radicals, where $R_2$ is an alkylene group which may contain hydroxyl substituents, and where $n$ is an integer.

The new compounds are readily prepared in an alkaline medium by reacting one molecular proportion of a symmetrical di-(alkyl substituted aromatic) thiourea with one or more molecular proportions of such compounds as ethylene oxide, propylene oxide, epichlorhydrin, propylene chlorhydrin, trimethylene chlorhydrin, glycerol alpha chlorhydrin, glycol, glycide, glycerol, polyglycerine, and the like. Two or more of these compounds may also be caused to react consecutively. Among the alkaline reacting agents which have been found useful are potassium and sodium hydroxide, however other like alkaline materials may be employed.

As exemplary of the preparation of the new compounds the following is illustrative but in no wise is to be construed as limitative thereof.

EXAMPLE 23.0 parts by weight (substantially 0.09 mol) of symmetrical di-ortho-tolyl thiourea was mixed with 0.2 part by weight of potassium hydroxide in a suitable reaction vessel. Thereto ethylene oxide was admitted to the molten thiourea through an alundum thimble while retaining the reaction temperature at 140–170° C. By the addition of various amounts of ethylene oxide a series consisting of liquids and low melting solids was prepared possessing the formula

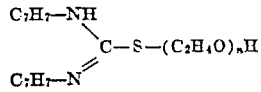

where $n$ represents an integer. The products were found to be soluble in many of the common organic solvents. Solubility in cold dilute mineral acid increased with increasing values of $n$ and compositions wherein $n$ was 5–30 were completely soluble in dilute hydrochloric acid. The above reaction product wherein $n$ was approximately 27 was soluble to the extent of about 4 per cent in water.

By replacing ethylene oxide with propylene oxide and reacting in an alkaline medium, a series of compounds possessing useful properties are also prepared. This latter type compound may be represented by the formula

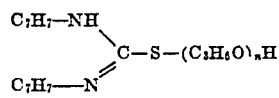

where $n$ is an integer. A series of products having the same empirical formula are prepared by reacting di-ortho-tolyl thiourea in various molecular proportions with propylene chlorhydrin and with trimethylene chlorhydrin in alkaline media.

A similar series of products possessing similar properties are obtained by reacting the symmetrical di-xylyl thioureas with ethylene oxide and propylene oxide respectively in an alkaline medium.

As illustrative of the utility of the new materials a typical example of the new class of compounds was employed in a metal pickling process in amounts normally employed under conditions which duplicated, so far as possible those commonly followed in commercial practice. Portions, namely 0.012% and 0.03% by weight based upon the weight of the pickling bath, of a member of the new class of compounds were incorporated in a pickling bath and evaluated in the following manner: A test piece of 28 gauge hot rolled tin plate steel stock, approximately 4″ x 3″ in dimension, was immersed in the pickling bath comprising substantially 750 cc. of a water solution containing approximately 6% by weight of 66° Bé. sulfuric acid and a small amount of one of the new compounds above described. The temperature of the bath was maintained at substantially 80° C. The steel test piece after thoroughly cleaning and pre-pickling for a few minutes in the absence of inhibitor and drying was weighed before immersion in the bath, and after 40 minutes pickling the test piece was again weighed, the difference between the two weights representing the metal loss during pickling. The metal loss compared with the metal loss of a similar test piece treated in an analogous manner but without the use of any inhibitor provides a measure of the inhibiting value of the compound employed. The results obtained on testing a typical example of the new class of materials are given in the following table. The metal loss is reported as the average of duplicate determinations.

While $n$ in the empirical formula below is a whole number for any given molecule, it is convenient to designate $n$ as a function of the average molecular weight or more particularly the total molecular weight equivalents actually reacted with each mol of ditolyl thiourea. Accordingly, the value of $n$ is the number of mols reacted per mol of di-ortho-tolyl thiourea and therefore assumes fractional values.

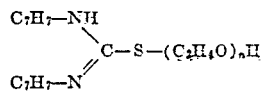

Table

| Value of $n$ | Percent by Weight of Inhibitor | Loss in Weight of Metal in Grams | Remarks |
|---|---|---|---|
| Blank | no inhibitor | 0.7764 | Plates pitted. |
| 7.4 | 0.012 | 0.0128 | Inhibitors completely soluble in pickling bath. Plates clean and bright. |
| 7.4 | 0.030 | 0.0091 | |

It is apparent from the above data that the new class of materials are a highly effective family of pickling inhibitors. Comparing the loss in weight of the steel test strips to the loss when no inhibitor is employed, it is apparent that a great saving in metal is effected by the employment of these new materials as pickling inhibitors. While the new compositions wherein $n$ is one possess pickling inhibiting properties, it has been found that the new compositions wherein $n$ is greater than one, and preferably at least five but less than thirty-one, are representative of a highly efficacious group of metal pickling inhibitors. Compositions wherein $n$ is approximately ten have been found particularly effective and economical.

The hydroxy substituted aliphatic derivatives of di-ortho-tolyl thiourea wherein $n$ is 20–35 exhibit water solubility and possess detergent properties. The new materials are soluble in many organic solvents and compositions wherein $n$ is fifteen or more may be employed as emulsifiers or wetters in non-aqueous systems.

While the invention has been illustrated by a number of specific embodiments of the invention, it will be apparent that many variations may be made from the specific procedures described and from the particular reactants and catalysts employed without departing from the spirit or scope of the invention.

What is claimed is:

1. As a new composition of matter a compound of the structure

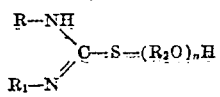

where R and R₁ are alkyl substituted monocyclic aryl radicals, where R₂ is an alkylene group and where $n$ is an integer greater than one.

2. As a new composition of matter a compound of the structure

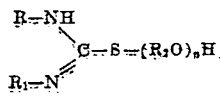

where R and R₁ are alkyl substituted phenyl radicals, where R₂ is an alkylene group containing less than four carbon atoms and where $n$ is an integer greater than one but not more than 35.

3. As a new composition of matter a compound of the structure

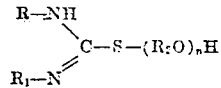

where R and R₁ are alkyl substituted phenyl radicals containing not more than two short chain alkyl groups, where R₂ is an ethylene group, and where $n$ is an integer greater than one but not more than 35.

4. As a new composition of matter a compound of the structure

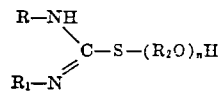

where R and R₁ are methyl substituted phenyl radicals, where R₂ is an ethylene group, and where $n$ is at least 5 but less than 31.

5. As a new composition of matter a compound of the structure

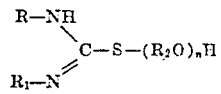

where R and R₁ are ortho tolyl radicals, where R₂ is an alkylene group containing less than four carbon atoms, and where $n$ is an integer more than one but not more than 35.

6. As a new composition of matter a compound of the structure

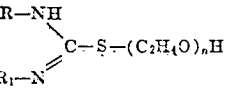

where R and R₁ are ortho tolyl radicals, and where $n$ is at least 5 but less than 31.

7. As a new composition of matter a compound of the structure

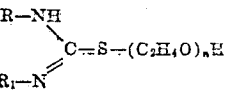

where R and R₁ are ortho tolyl radicals, and where $n$ is approximately 10.

8. The method of making the composition of claim 1 which comprises condensing in the presence of an alkaline reacting agent one molecular proportion of an N,N' di(alkyl substituted monocyclic aryl) thiourea with more than one molecular proportion of an alkylene oxide.

9. The method of making the composition of claim 2 which comprises condensing in the presence of an alkaline reacting agent one molecular proportion of an N,N' di(alkyl substituted phenyl) thiourea with more than one molecular proportion of an alkylene oxide containing less than four carbon atoms.

10. The method of making the composition of claim 3 which comprises condensing in the presence of an alkaline reacting agent one molecular proportion of an N,N' di(alkyl substituted phenyl) thiourea containing not more than two short chain alkyl groups in each phenyl nucleus with more than one molecular proportion of ethylene oxide.

11. The method of making the composition of claim 5 which comprises condensing in the presence of an alkaline reacting agent one molecular proportion of N,N' di-ortho-tolyl thiourea with more than one but not more than 35 molecular proportions of ethylene oxide.

12. The method of making the composition of claim 6 which comprises condensing in the presence of an alkaline reacting agent one molecular proportion of N,N' di-ortho-tolyl thiourea with 5 to 30 molecular proportions of ethylene oxide.

13. The method of making the composition of claim 7 which comprises condensing in the presence of an alkaline reacting agent one molecular proportion of N,N' di-ortho-tolyl thiourea with approximately 10 molecular proportions of ethylene oxide.

14. A member of the group consisting of compounds of the formula:

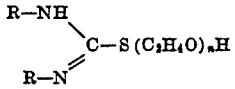

wherein R is an alkyl substituted monocyclic aromatic hydrocarbon radical and $n$ is an integer greater than one, and mineral acid salts thereof.

PAUL M. DOWNEY.

REFERENCES CITED

The following references are of record in the file of this patent:

UNITED STATES PATENTS

| Number | Name | Date |
| --- | --- | --- |
| 1,970,578 | Schoeller et al. | Aug. 21, 1934 |

OTHER REFERENCES

Olin et al.: "Jour. Am. Chem. Soc.," vol. 52 (1930), pp. 3322 to 3327.